US012009639B2

(12) United States Patent
Sekizawa et al.

(10) Patent No.: US 12,009,639 B2
(45) Date of Patent: Jun. 11, 2024

(54) SPARK PLUG

(71) Applicant: NGK SPARK PLUG CO., LTD., Nagoya (JP)

(72) Inventors: Takashi Sekizawa, Nagoya (JP); Tomokatsu Kashima, Nagoya (JP); Yuya Ono, Nagoya (JP); Yuki Toumatsu, Nagoya (JP); Yudai Kawaguchi, Nagoya (JP); Kazuyoshi Torii, Nagoya (JP)

(73) Assignee: NGK SPARK PLUG CO., LTD, Nagoya (JP)

( * ) Notice: Subject to any disclaimer, the term of this patent is extended or adjusted under 35 U.S.C. 154(b) by 343 days.

(21) Appl. No.: 17/437,679

(22) PCT Filed: Nov. 17, 2020

(86) PCT No.: PCT/JP2020/042783

§ 371 (c)(1),
(2) Date: Sep. 9, 2021

(87) PCT Pub. No.: WO2021/106681

PCT Pub. Date: Jun. 3, 2021

(65) Prior Publication Data

US 2022/0166196 A1 May 26, 2022

(30) Foreign Application Priority Data

Nov. 29, 2019 (JP) ................................ 2019-217461

(51) Int. Cl.
*H01T 13/32* (2006.01)
*H01T 13/06* (2006.01)
*H01T 21/02* (2006.01)

(52) U.S. Cl.
CPC ............ *H01T 13/32* (2013.01); *H01T 13/06* (2013.01); *H01T 21/02* (2013.01)

(58) Field of Classification Search
CPC ......... H01T 13/32; H01T 13/06; H01T 21/02; H01T 13/20; F21S 41/285; F21Y 2115/30
See application file for complete search history.

(56) References Cited

U.S. PATENT DOCUMENTS 8,841,827 B2 9/2014 Sakayanagi et al.
2010/0264803 A1* 10/2010 Nunome ................ H01T 13/39 445/7
2018/0264596 A1 9/2018 Inoue

FOREIGN PATENT DOCUMENTS

JP 2018/156728 A 10/2018
WO WO 2012/042801 A1 4/2012

OTHER PUBLICATIONS

International Preliminary Report on Patentability and Written Opinion mailed Jun. 9, 2022 from corresponding International Patent Appl. No. PCT/JP2020/042783.

(Continued)

*Primary Examiner* — Elmito Breval
(74) *Attorney, Agent, or Firm* — Kusner & Jaffe

(57) ABSTRACT

A spark plug that can reduce variation in a discharge point. The spark plug includes: a center electrode; a metal shell insulating and holding the center electrode; and a ground electrode including a base material having one end portion connected to the metal shell, and a tip connected to another end portion of the base material. The tip has a discharge surface opposed to the center electrode with a spark gap therebetween. The discharge surface has a quadrangular shape and is chamfered at four sides thereof. Only a first side which is one of the four sides is provided with a C chamfer.

7 Claims, 10 Drawing Sheets

(56) References Cited

OTHER PUBLICATIONS

International Search Report from corresponding International Patent Application No. PCT/JP20/42783, dated Jan. 26, 2021.

* cited by examiner

SPARK PLUG

FIELD OF THE INVENTION

The present invention relates to a spark plug, and in particular, relates to a spark plug including a ground electrode having a base material with a tip joined thereto.

BACKGROUND OF THE INVENTION

Regarding a spark plug having a spark gap between a tip of a ground electrode and a center electrode, Japanese Patent Application Laid-Open (kokai) No. 2018-156728 (Patent Document 1) discloses a configuration using a tip having a quadrangular-shaped discharge surface.

In the conventional configuration, when a potential difference arises between the ground electrode and the center electrode, an electric field is concentrated near sides of the discharge surface of the tip on the ground electrode. Thus, discharge points (discharge occurrence positions) on the tip are widely distributed near the four sides of the discharge surface. When a discharge point varies around the four sides, the position of an initial flame kernel serving as a center of flame propagation varies, and therefore there is a possibility that accuracy of combustion prediction for evaluating ignitability by the spark plug is reduced. For improving accuracy of combustion prediction, reduction of variation in a discharge point is required.

SUMMARY OF THE INVENTION

The present invention has been made to meet the above requirement, and an object of the present invention is to provide a spark plug that can reduce variation in a discharge point.

Means for Solving the Problem

To attain the above object, a spark plug of the present invention includes: a center electrode; a metal shell insulating and holding the center electrode; and a ground electrode including a base material having one end portion connected to the metal shell, and a tip connected to another end portion of the base material. The tip has a discharge surface opposed to the center electrode with a spark gap therebetween. The discharge surface has a quadrangular shape and is chamfered at four sides thereof. Only a first side which is one of the four sides is provided with a C chamfer.

Another spark plug of the present invention includes: a center electrode; a metal shell insulating and holding the center electrode; and a ground electrode including a base material having one end portion connected to the metal shell, and a tip connected to another end portion of the base material. The tip has a discharge surface opposed to the center electrode with a spark gap therebetween. The discharge surface has a quadrangular shape and is chamfered at four sides thereof. Of the four sides of the discharge surface, two or more sides including a first side are provided with C chamfers. In comparison of sizes of the chamfering of the two or more sides provided with the C chamfers, the size of the chamfering of the first side is smaller than the sizes of the chamfering of the other sides.

Advantageous Effects of the Invention

According to a first aspect, the four sides of the discharge surface of the tip are chamfered, and only the first side which is one of the four sides of the discharge surface is provided with the C chamfer. Therefore, an electric field is more concentrated near the first side, so that a discharge point is more likely to arise near the first side. Thus, variation in a discharge point can be reduced.

According to a second aspect, a size of the chamfering provided to the first side is smaller than sizes of the chamfering provided to the three sides other than the first side. Therefore, an electric field is even more concentrated near the first side. Thus, in addition to the effect of the first aspect, variation in a discharge point can be further reduced.

According to a third aspect, four sides of the discharge surface of the tip are chamfered. Of the four sides of the discharge surface, two or more sides including the first side are provided with C chamfers. In comparison of sizes of the chamfering of the two or more sides provided with the C chamfers, the size of the chamfering of the first side is smaller than the sizes of the chamfering of the other sides. Therefore, an electric field is more concentrated near the first side. Thus, a discharge point is more likely to arise near the first side, so that variation in a discharge point can be reduced.

According to a fourth aspect, a size of the chamfering provided to a second side opposite to the first side is greater than sizes of the chamfering provided to the three sides other than the second side. Therefore, an electric field is less concentrated near the second side opposite to the first side. Thus, in addition to the effect of the third aspect, variation in a discharge point can be further reduced.

According to a fifth aspect, a second side opposite to the first side is provided with an R chamfer. Therefore, a discharge point is less likely to arise near the second side, as compared to a case where the second side is provided with a C chamfer. Thus, in addition to the effect of the third or fourth aspect, variation in a discharge point can be further reduced.

According to a sixth aspect, the first side is located closer to an end surface of the other end portion of the ground electrode than the three sides other than the first side. An initial flame kernel arising by discharge near the first side located closer to the end surface is less deprived of energy by the base material. The initial flame kernel grows well and flame propagation is readily started. Thus, in addition to the effect of any one of the first to fifth aspects, ignitability can be improved.

According to a seventh aspect, a melt portion for joining the tip to the base material is formed on a back surface opposite to the discharge surface, along the discharge surface from the end surface of the other end portion of the base material. Near the first side of the discharge surface, discharge occurs frequently and heat is more likely to be generated, so that thermal stress of the tip is more likely to be great. A thickness of the melt portion in a direction perpendicular to the discharge surface becomes smaller with increase in a distance from the end surface along the discharge surface. Therefore, thermal stress of the tip near the first side is more relaxed by the melt portion. Thus, in addition to the effect of the sixth aspect, breakage of the melt portion or peeling of the tip due to thermal stress can be suppressed.

DETAILED DESCRIPTION OF THE INVENTION

Figure 1:
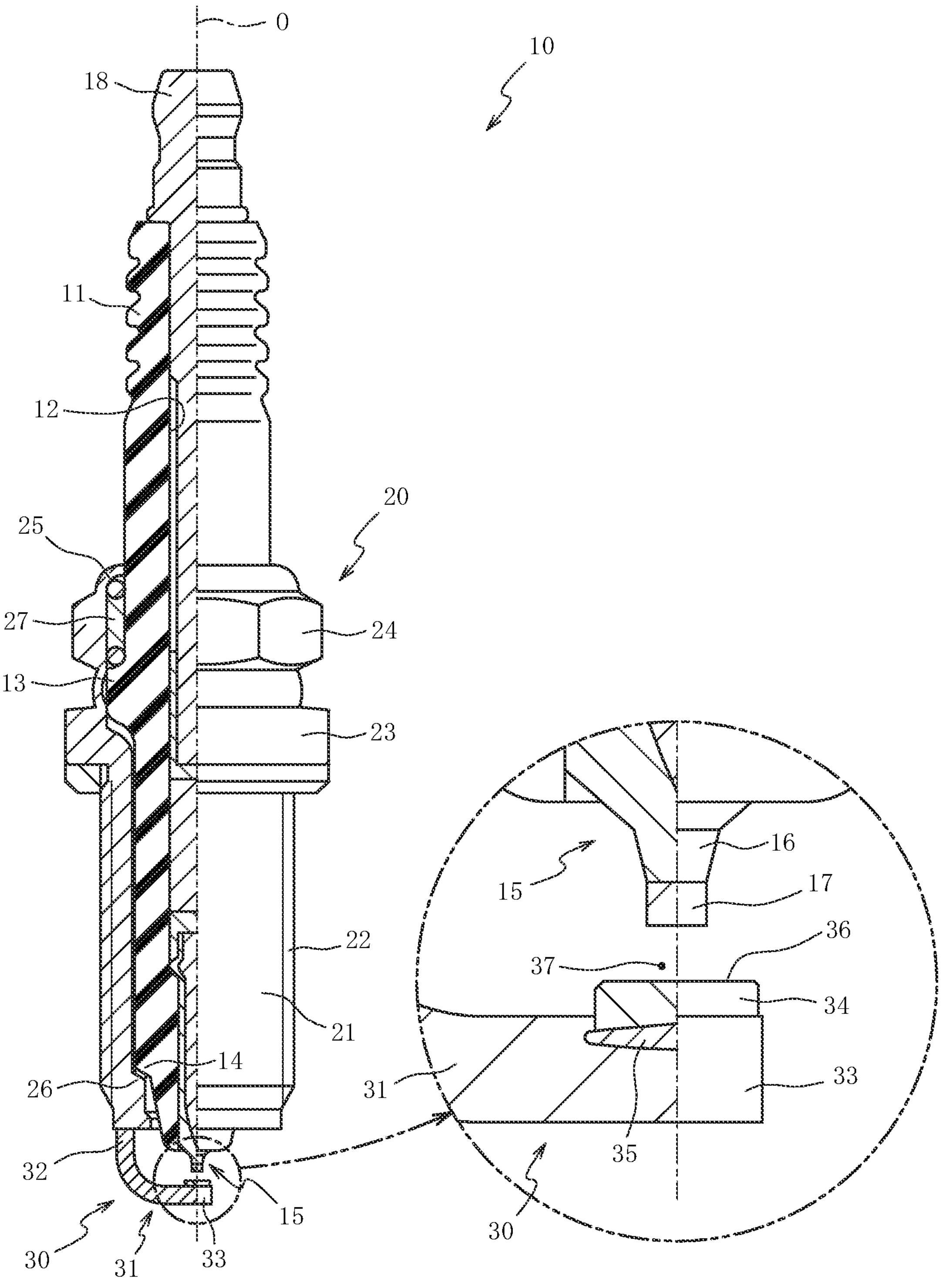
FIG. 1 is a half-sectional view of a spark plug according to the first embodiment.

Hereinafter, preferred embodiments of the present invention will be described with reference to the accompanying drawings. FIG. 1 is a half-sectional view of a spark plug 10 according to the first embodiment, with an axial line O as a boundary. In FIG. 1, the lower side on the drawing sheet is referred to as a front side of the spark plug 10, and the upper side on the drawing sheet is referred to as a rear side of the spark plug 10. As shown in FIG. 1, the spark plug 10 includes an insulator 11, a center electrode 15, a metal shell 20, and a ground electrode 30.

The insulator 11 is a substantially cylindrical member made of ceramic such as alumina which is excellent in mechanical property and in insulation property under high temperature. The insulator 11 has an axial hole 12 extending along the axial line O. The insulator 11 has, substantially at the center in the axial-line direction, an annular protruding portion 13 protruding radially outward. The insulator 11 has, on the front side with respect to the protruding portion 13, a step portion 14 having an outer diameter that reduces toward the front side in the axial-line direction. The center electrode 15 is provided on the front side of the axial hole 12 of the insulator 11.

The center electrode 15 is a bar-shaped electrode held by the insulator 11 along the axial line O. The center electrode 15 is formed such that a core material having excellent thermal conductivity is embedded in a base material 16. The base material 16 is formed from a metal material made of Ni or an alloy containing Ni as a main component. The core material is formed from copper or an alloy containing copper as a main component. The core material may be omitted. A tip 17 containing a noble metal is joined to a front end of the base material 16. The tip 17 may be omitted.

The center electrode 15 is electrically connected to a metal terminal 18, in the axial hole 12 of the insulator 11. The metal terminal 18 is a bar-shaped member to which a high-voltage cable (not shown) is connected, and is made of a conductive metal material (e.g., low-carbon steel).

The metal shell 20 is a substantially cylindrical member made of a conductive metal material (e.g., low-carbon steel) and extending along the axial line O. The metal shell 20 includes a front end portion 21 surrounding a part of the insulator 11 on the front side with respect to the protruding portion 13, a seat portion 23 contiguous to the rear side of the front end portion 21, a tool engagement portion 24 formed on the rear side of the seat portion 23, and a rear end portion 25 contiguous to the rear side of the tool engagement portion 24. The front end portion 21 has, on the outer circumference thereof, an external thread 22 formed over almost the entire length in the axial-line direction of the front end portion 21 and configured to be screwed into a screw hole of an engine (not shown). The front end portion 21 has, on the inner circumference thereof, a ledge portion 26 having an inner diameter that reduces toward the front side in the axial-line direction.

The seat portion 23 is a part for restricting the screwed amount of the external thread 22 to the engine and applying an axial tension to the tightened external thread 22. The tool engagement portion 24 is a part with which a tool such as a wrench is to be engaged when the external thread 22 is screwed into the screw hole of the engine. The rear end portion 25 is an annular part bent radially inward. The rear end portion 25 is located on the rear side with respect to the protruding portion 13 of the insulator 11.

Between the protruding portion 13 of the insulator 11 and the rear end portion 25 of the metal shell 20, a seal portion 27 filled with powder of talc or the like is provided over the entire circumference. An annular packing (not shown) made of metal is interposed between the step portion 14 of the insulator 11 and the ledge portion 26 of the metal shell 20. The ground electrode 30 is connected to the front end portion 21 of the metal shell 20.

The ground electrode 30 includes a base material 31 made of a conductive metal material (e.g., Ni-based alloy), and a tip 34 joined to the base material 31. The base material 31 is a bar-shaped member having one end portion 32 joined to the metal shell 20 and another end portion 33 to which the tip 34 is joined. The tip 34 has a chemical composition containing one kind or two or more kinds of noble metals such as Pt, Rh, Ir, and Ru, for example. The tip 34 is joined to the base material 31 via a melt portion 35. A spark gap 37 is formed between a discharge surface 36 of the tip 34 of the ground electrode 30 and the center electrode 15.

The spark plug 10 is manufactured by the following method, for example. First, the center electrode 15 is placed in the axial hole 12 of the insulator 11. Then, with electric conduction ensured between the center electrode 15 and the metal terminal 18, the metal terminal 18 is inserted into the axial hole 12 of the insulator 11. Next, the insulator 11 is inserted into the metal shell 20 with the ground electrode 30 connected thereto in advance, whereby the metal shell 20 is attached to the insulator 11. A part from the ledge portion 26 to the rear end portion 25 of the metal shell 20 applies a compressive load in the axial-line direction to a part from the step portion 14 to the protruding portion 13 of the insulator 11, via the seal portion 27 and the packing (not shown). Thus, the insulator 11 is held by the metal shell 20. Next, the base material 31 of the ground electrode 30 is bent to form the spark gap 37, thus obtaining the spark plug 10.

Figure 2:
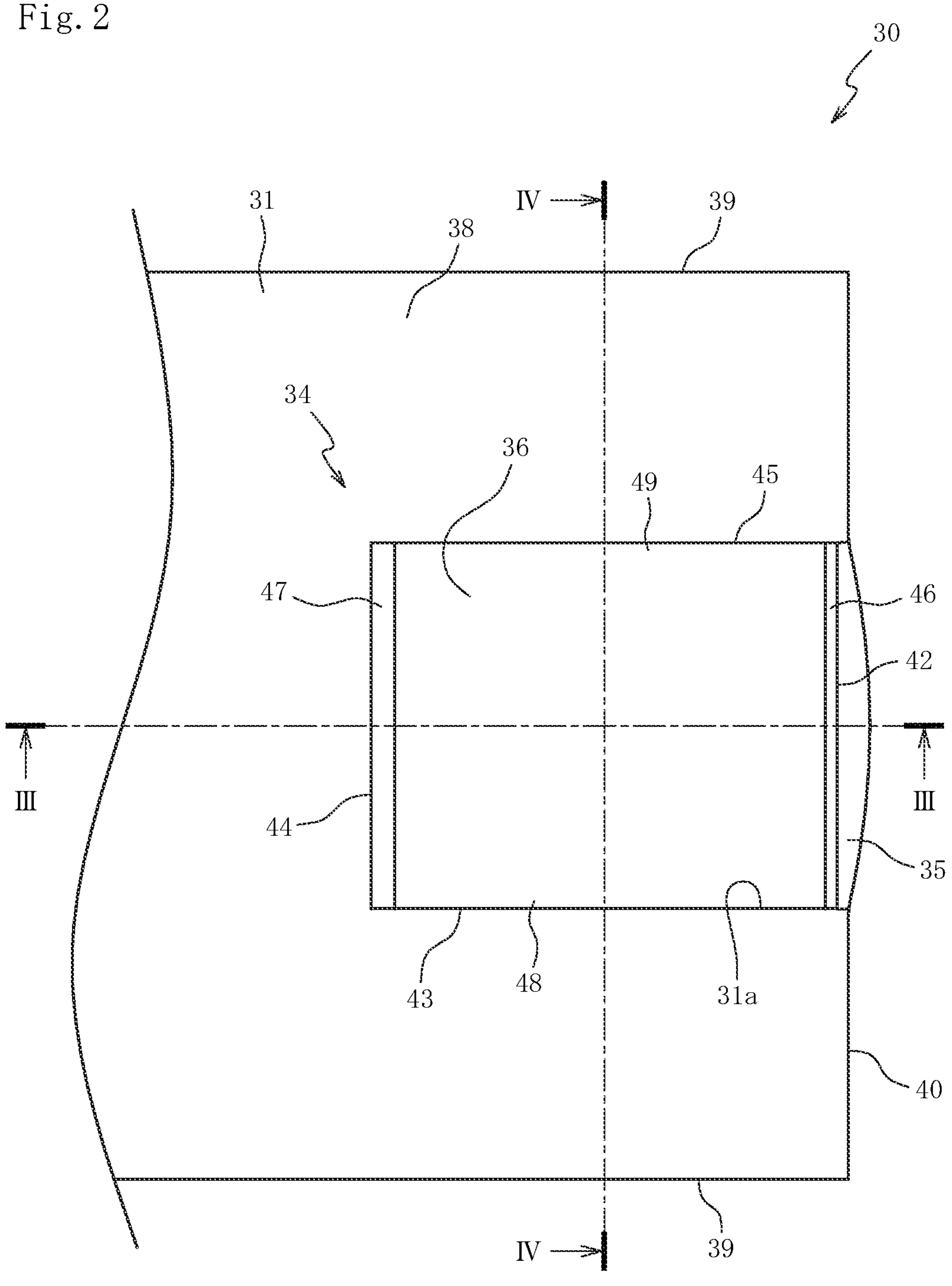
FIG. 2 is a plan view of a ground electrode.
Figure 3:
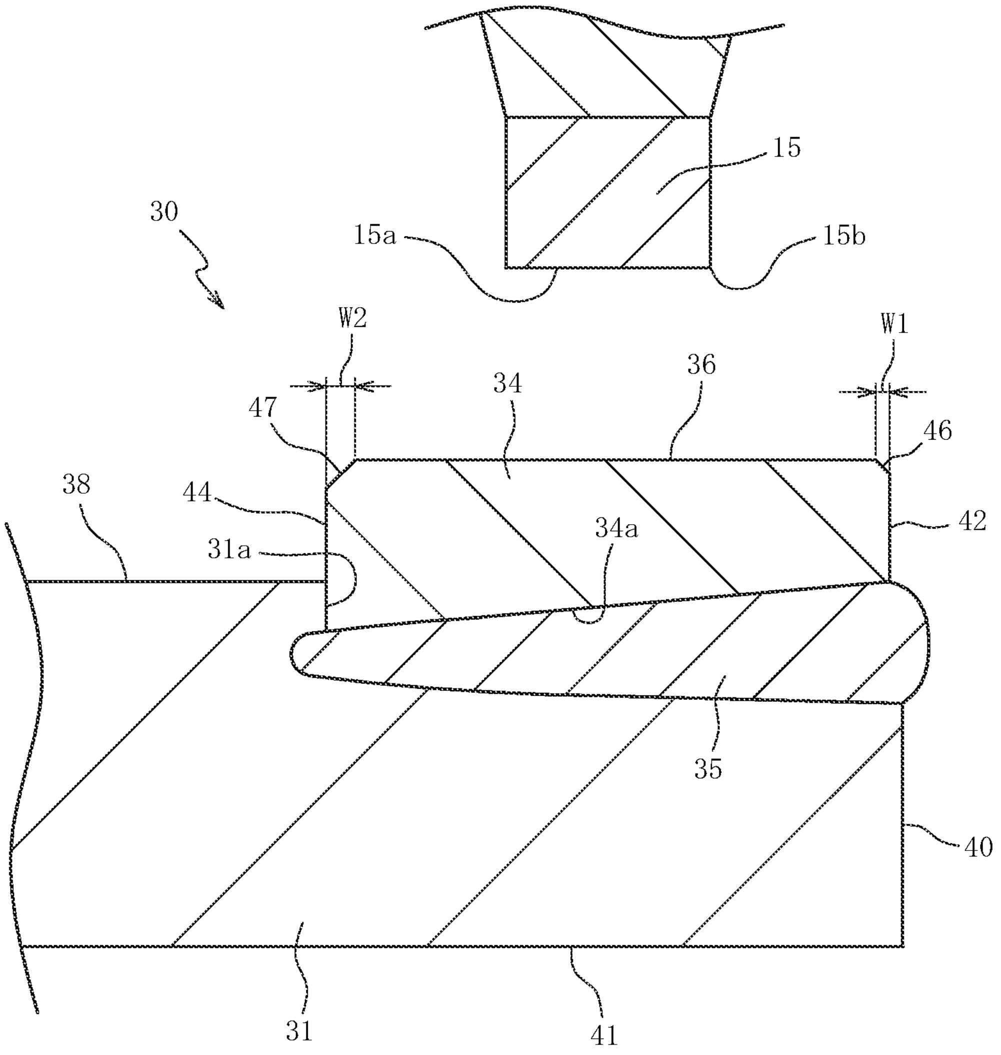
FIG. 3 is a sectional view of the ground electrode along line III-III in FIG. 2.
Figure 4:
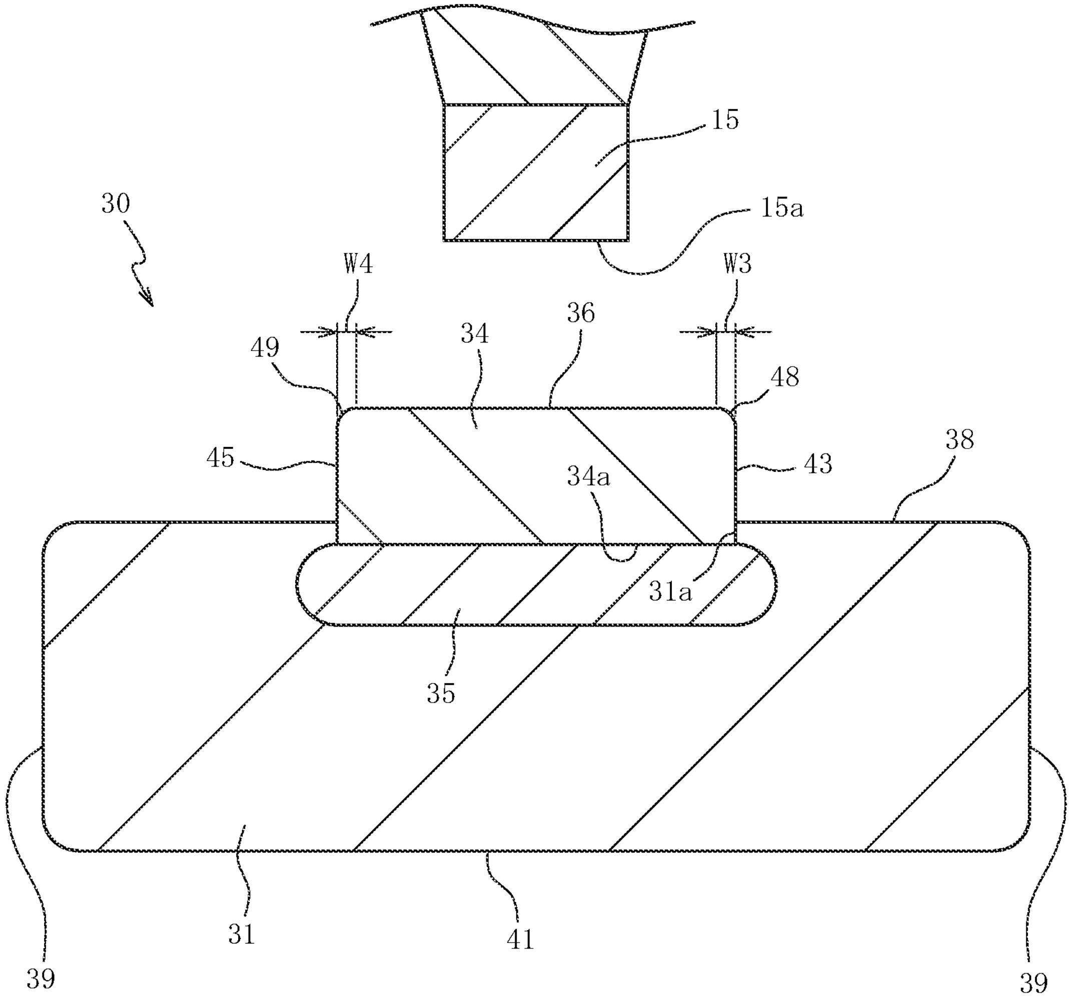
FIG. 4 is a sectional view of the ground electrode along line IV-IV in FIG. 2.

FIG. 2 is a plan view of the ground electrode 30. FIG. 2 shows the other end portion 33 (see FIG. 1) of the base material 31, and the one end portion 32 (see FIG. 1) is not shown. FIG. 3 is a sectional view of the ground electrode 30 along line III-III in FIG. 2. FIG. 4 is a sectional view of the ground electrode 30 along line IV-IV in FIG. 2.

As shown in FIG. 2 to FIG. 4, the other end portion 33 (see FIG. 1) of the base material 31 has a first surface 38 facing the center electrode 15 side, a pair of second surfaces 39 connected to the first surface 38 and extending from the other end portion 33 side to the one end portion 32 (see FIG. 1) side, an end surface 40 connected to the first surface 38 and the second surfaces 39, and a third surface 41 connected to the second surfaces 39 and the end surface 40. The third surface 41 is located opposite to the first surface 38.

The first surface 38 of the base material 31 has a recess 31*a* connected to the end surface 40 of the base material 31. The tip 34 is provided in the recess 31*a*. The melt portion 35 for joining the tip 34 to the base material 31 is formed on a back surface 34*a* opposite to the discharge surface 36 of the tip 34, along the discharge surface 36 from the end surface 40 of the base material 31.

The discharge surface 36 of the tip 34 has a quadrangular shape enclosed by four sides. The discharge surface 36 is connected to side surfaces 42, 43, 44, 45 of the tip 34. The side surface 42 of the tip 34 faces in the same direction as the end surface 40 of the base material 31. The side surfaces 43, 45 of the tip 34 respectively face in the same directions as the second surfaces 39 of the base material 31. The side surface 44 of the tip 34 is located opposite to the side surface 42 of the tip 34. In the present embodiment, the area of the discharge surface 36 of the tip 34 is larger than the area of a discharge surface 15*a* (see FIG. 3) of the center electrode 15, and the entire discharge surface 15*a* of the center electrode 15 is opposed to the discharge surface 36 of the tip 34 in the axial-line direction. The discharge surface 15*a* has a round shape.

The four sides of the discharge surface 36 are intersection lines between the discharge surface 36 and the side surfaces 42, 43, 44, 45 of the tip 34. The intersection line between the side surface 42 and the discharge surface 36 is a first side 46. A second side 47 opposite to the first side 46 is the intersection line between the side surface 44 and the discharge surface 36. The intersection line between the side surface 43 and the discharge surface 36 is a third side 48. A fourth side 49 opposite to the third side 48 is the intersection line between the side surface 45 and the discharge surface 36.

In the present embodiment, the first side 46 is located closer to the end surface 40 of the base material 31 than the three sides 47, 48, 49 other than the first side 46. The first side 46 is almost parallel to the end surface 40. The second side 47 is located farther from the end surface 40 of the base material 31 than the three sides 46, 48, 49 other than the second side 47.

All the sides 46, 47, 48, 49 enclosing the discharge surface 36 of the tip 34 are chamfered. The discharge surface 36 is provided with C chamfers at two or more sides including the first side 46. In the present embodiment, the first side 46 and the second side 47 are provided with C chamfers, and the third side 48 and the fourth side 49 are provided with R chamfers. Instead of the R chamfers provided to the third side 48 and the fourth side 49, C chamfers may be provided to the third side 48 and the fourth side 49.

The C chamfer provided to the first side 46 (see FIG. 3) is a corner surface connecting the discharge surface 36 and the side surface 42. The C chamfer provided to the second side 47 is a corner surface connecting the discharge surface 36 and the side surface 44. Regarding the C chamfers, the angle at which each corner surface intersects the discharge surface 36 or the side surface 42, 44 is not limited to 45°. The angles of the corner surfaces are set to any angle greater than 0° and smaller than 90°.

A size W1 (see FIG. 3) of the chamfering provided to the first side 46 is smaller than a size W2 of the chamfering provided to the second side 47. The sizes W1, W2 of the chamfering of the C chamfers refer to widths in directions that are perpendicular to the respective sides 46, 47 and parallel to the discharge surface 36.

The R chamfer provided to the third side 48 (see FIG. 4) is a round surface or an elliptic surface connecting the discharge surface 36 and the side surface 43. The R chamfer provided to the fourth side 49 is a round surface or an elliptic surface connecting the discharge surface 36 and the side surface 45. A size W3 of the chamfering provided to the third side 48 is almost the same as a size W4 of the chamfering provided to the fourth side 49. The sizes W3, W4 of the chamfering of the R chamfers refer to the radii of curvature of the respective R chamfers. The sizes W3, W4 of the chamfering may be different. In the present embodiment, the size W2 of the chamfering provided to the second side 47 is greater than the sizes W1, W3, W4 of the chamfering provided to the other three sides 46, 48, 49.

The thickness of the melt portion 35 (see FIG. 3) in a direction perpendicular to the discharge surface 36 of the tip 34 becomes smaller with increase in the distance from the end surface 40 of the base material 31 along the discharge surface 36, i.e., with decrease in the distance to the one end portion 32 (see FIG. 1) of the base material 31. The thickness of the melt portion 35 at a part contacting the side surface 42 of the tip 34 is greater than the thickness of the melt portion 35 at a part contacting the side surface 44 of the tip 34.

The melt portion 35 is obtained by, after placing the tip 34 in the recess 31*a* of the base material 31, applying a laser beam from the end surface 40 side of the base material 31 almost in parallel to the discharge surface 36 and scanning the laser beam from one end to another and of the side surface 42 of the tip 34. The laser medium may be, for example, a fiber laser or a disk laser, but is not limited thereto. The melt portion 35 is formed by the tip 34 and the base material 31 being melted with each other.

With voltage applied between the metal terminal 18 (see FIG. 1) and the metal shell 20 of the spark plug 10, when the potential difference between the center electrode 15 and the ground electrode 30 has reached discharge voltage, discharge occurs in the spark gap 37 and an initial flame kernel is formed. When the initial flame kernel has heated the surrounding air-fuel mixture to an ignition temperature, flame propagation begins and the air-fuel mixture is combusted.

In the ground electrode 30, an electric field is more concentrated at the four sides of the discharge surface 36 of the tip 34, and thus a discharge point (discharge occurrence position) is likely to arise near the sides 46, 47, 48, 49 of the discharge surface 36. In particular, at the sides provided with the C chamfers among the four chamfered sides 46, 47, 48, 49, a discharge point is more likely to arise than at the sides provided with the R chamfers, and a discharge point is more likely to arise at a side having a smaller chamfering size.

In the spark plug 10, the first side 46 and the second side 47 are provided with C chamfers, and the third side 48 and the fourth side 49 are provided with R chamfers. In comparison between the size W1 of the chamfering of the first side 46 and the size W2 of the chamfering of the second side 47 which are provided with the C chamfers, the size W1 of the chamfering of the first side 46 is smaller than the size W2 of the chamfering of the second side 47, so that an electric field is more concentrated near the first side 46. Thus, a discharge point is more likely to arise near the first side 46, so that variation in a discharge point can be reduced. As a result, the initial flame kernel serving as a center of flame propagation is more likely to be formed near the first side 46, so that variation in the position of the initial flame kernel is reduced. Thus, accuracy of combustion prediction for evaluating ignitability by the spark plug 10 can be improved.

The size W1 of the chamfering provided to the first side 46 is smaller than the sizes W2, W3, W4 of the chamfering provided to the other three sides 47, 48, 49. Thus, an electric field is even more concentrated near the first side 46, whereby variation in a discharge point can be further reduced.

The size W2 of the chamfering provided to the second side 47 opposite to the first side 46 is greater than the sizes W1, W3, W4 of the chamfering provided to the three sides 46, 48, 49 other than the second side 47. Thus, an electric field is less concentrated near the second side 47 opposite to the first side 46, so that a discharge point is more likely to arise at a part other than the second side 47 and closer to the first side 46. Thus, variation in a discharge point can be further reduced.

The third side 48 and the fourth side 49 connecting the first side 46 and the second side 47 are provided with the R chamfers. Therefore, a discharge point can be less likely to arise near the third side 48 and the fourth side 49, as compared to a case where the third side 48 and the fourth side 49 are provided with C chamfers. Thus, a discharge point is more likely to arise near the first side 46, so that variation in a discharge point can be further reduced.

In the center electrode 15, an electric field is more concentrated at an edge 15*b* (see FIG. 3) of the discharge surface 15*a*. The entire discharge surface 15*a* is opposed to the discharge surface 36 of the tip 34 in the axial-line direction, and the discharge surface 15*a* has a round shape. Therefore, a point where the distance from the first side 46 to the edge 15*b* of the discharge surface 15*a* is shortest is uniquely determined on the first side 46. A discharge point is more likely to arise near the above point on the first side 46, so that variation in a discharge point can be further reduced.

The first side 46 of the discharge surface 36 is located closer to the end surface 40 of the base material 31 than the other three sides 47, 48, 49 of the discharge surface 36. Since a discharge point is more likely to arise near the first side 46 having a smaller chamfering size, an initial flame kernel is more likely to be formed near the first side 46. A part near the first side 46 located closer to the end surface 40 of the base material 31 is more opened as compared to parts near the other sides 47, 48, 49. Therefore, an initial flame kernel arising near the first side 46 is less deprived of energy by the base material 31. The initial flame kernel grows well and flame propagation is readily started. Thus, ignitability can be improved.

On the other hand, if discharge occurs frequently near the first side 46, a part near the first side 46 is more likely to generate heat, so that thermal stress near the first side 46 of the tip 34 is more likely to be great. The thickness of the melt portion 35 in the direction perpendicular to the discharge surface 36 becomes greater with decrease in the distance to the end surface 40 of the base material 31 along the discharge surface 36. Therefore, thermal stress near the first side 46 of the tip 34 is more relaxed by the melt portion 35. Thus, breakage of the melt portion 35 or peeling of the tip 34 due to thermal stress can be suppressed.

The second embodiment will be described with reference to FIG. 5 to FIG. 7. In first embodiment, the case where two or more of the four sides 46, 47, 48, 49 of the discharge surface 36 of the tip 34 are provided with C chamfers, has been described. On the other hand, in the second embodiment, a case where only one of four sides 53, 54, 55, 56 of a discharge surface 52 of a tip 51 is provided with a C chamfer, will be described. The same parts as those described in the first embodiment are denoted by the same reference characters, and description thereof will not be repeated below.

Figure 5:
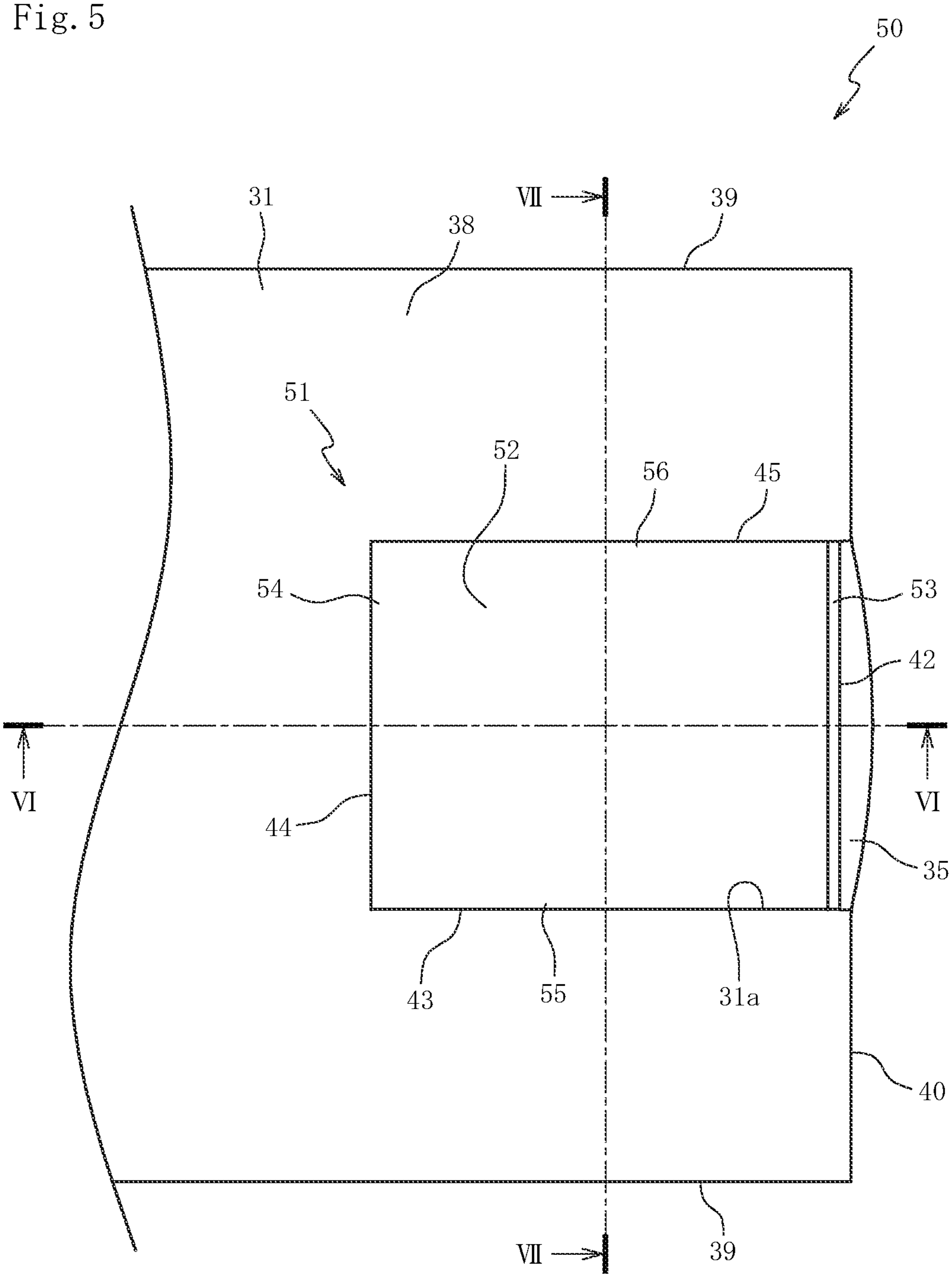
FIG. 5 is a plan view of a ground electrode of a spark plug according to the second embodiment.

FIG. 5 is a plan view of a ground electrode 50 of a spark plug according to the second embodiment. FIG. 6 is a sectional view of the ground electrode 50 along line VI-VI in FIG. 5. FIG. 7 is a sectional view of the ground electrode 50 along line VII-VII in FIG. 5. Instead of the ground electrode 30 of the spark plug 10 in the first embodiment, the ground electrode 50 is connected to the metal shell 20. FIG. 5 shows the other end portion 33 (see FIG. 1) of the base material 31 of the ground electrode 50, and the one end portion 32 (see FIG. 1) is not shown.

Figure 6:
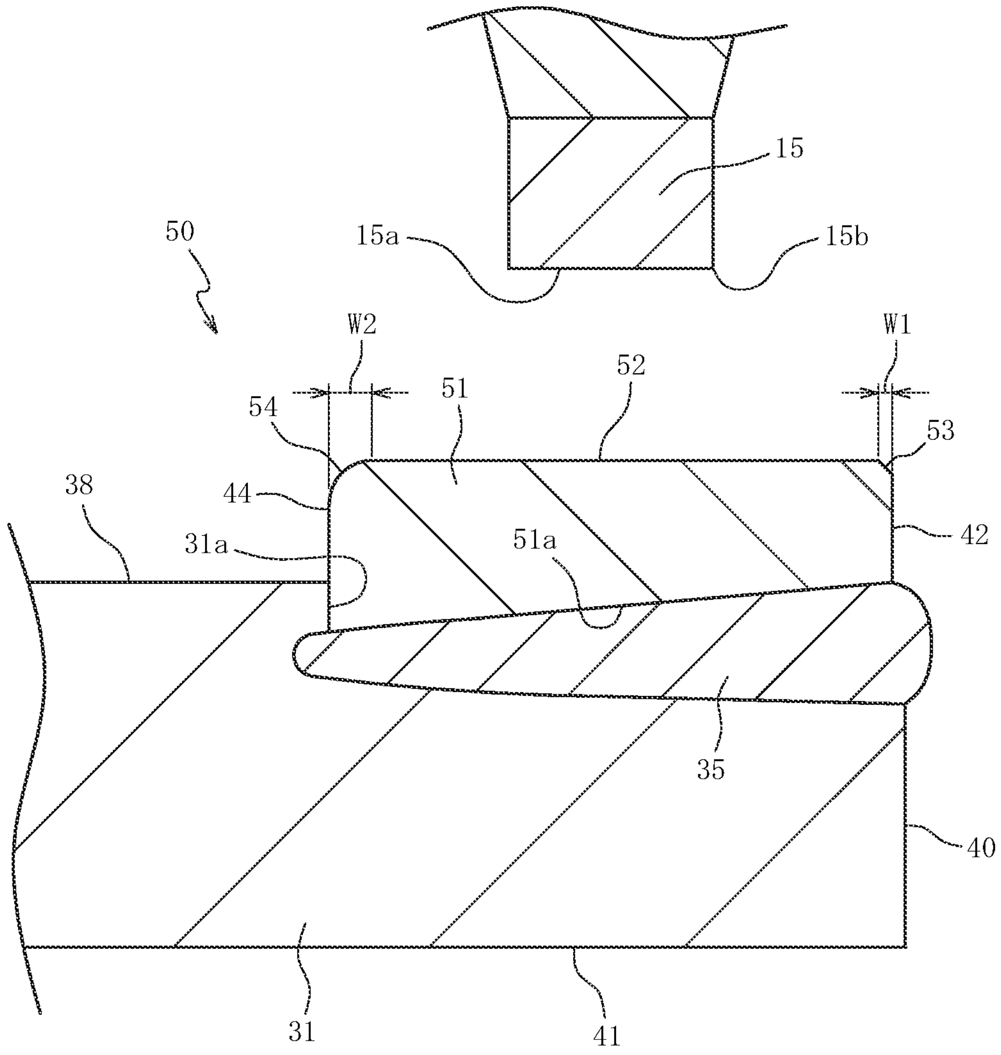
FIG. 6 is a sectional view of the ground electrode along line VI-VI in FIG. 5.
Figure 7:
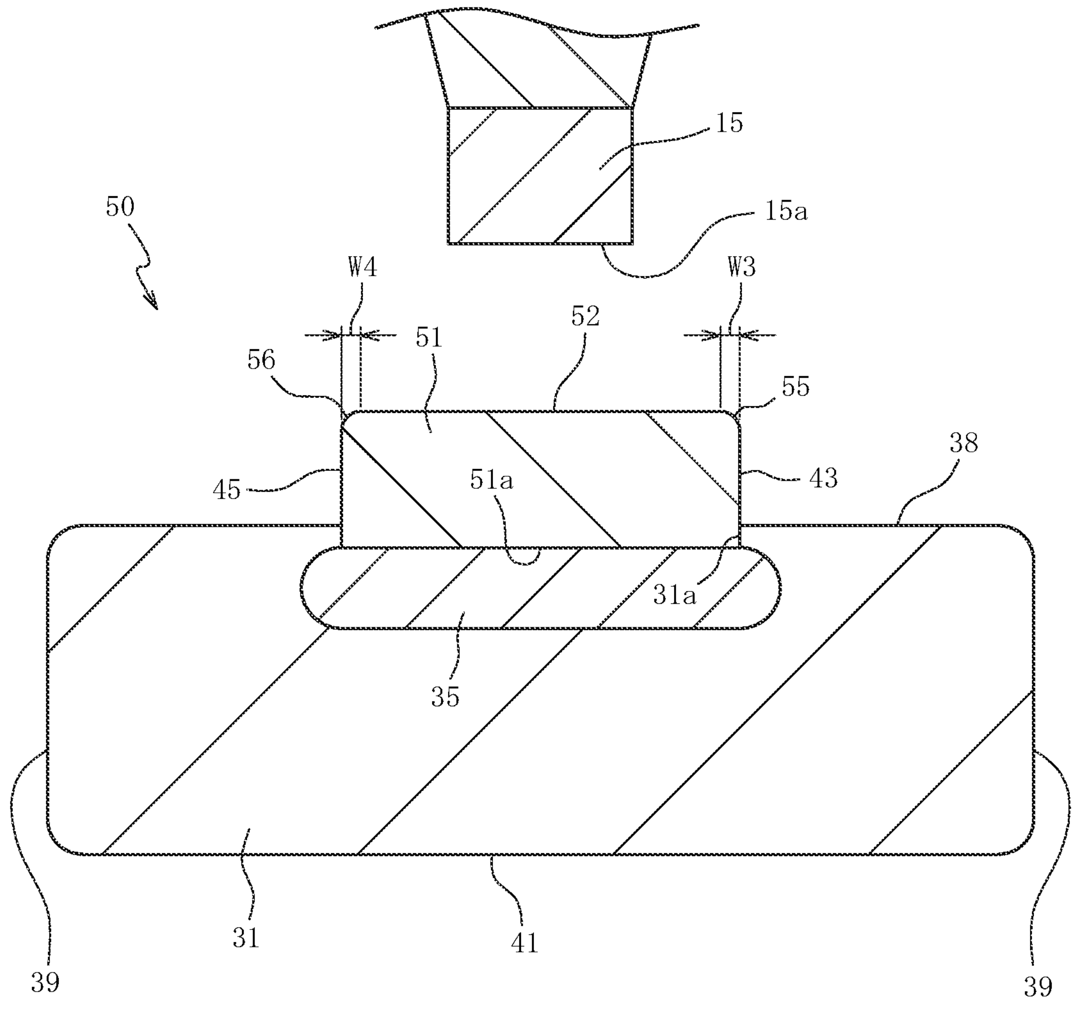
FIG. 7 is a sectional view of the ground electrode along line VII-VII in FIG. 5.

As shown in FIG. 5 to FIG. 7, the tip 51 of the ground electrode 50 is placed in the recess 31*a* provided to the base material 31. The melt portion 35 for joining the tip 51 to the base material 31 is formed on a back surface 51*a* opposite to the discharge surface 52 of the tip 51, along the discharge surface 52 from the end surface 40 of the base material 31.

The discharge surface 52 of the tip 51 has a quadrangular shape enclosed by four sides. The discharge surface 52 is connected to the side surfaces 42, 43, 44, 45 of the tip 51. In the present embodiment, the area of the discharge surface 52 of the tip 51 is larger than the area of the discharge surface 15*a* (see FIG. 6) of the center electrode 15, and the entire discharge surface 15*a* of the center electrode 15 is opposed to the discharge surface 52 of the tip 51 in the axial-line direction.

The four sides of the discharge surface 52 are intersection lines between the discharge surface 52 and the side surfaces 42, 43, 44, 45 of the tip 51. The intersection line between the side surface 42 and the discharge surface 52 is the first side 53. The second side 54 opposite to the first side 53 is the intersection line between the side surface 44 and the discharge surface 52. The intersection line between the side surface 43 and the discharge surface 52 is the third side 55. The fourth side 56 opposite to the third side 55 is the intersection line between the side surface 45 and the discharge surface 52. In the present embodiment, the first side 53 is located closer to the end surface 40 of the base material 31 than the three sides 54, 55, 56 other than the first side 53.

All the sides 53, 54, 55, 56 enclosing the discharge surface 52 are chamfered. Only the first side 53 of the discharge surface 52 is provided with a C chamfer, and the other three sides 54, 55, 56 are provided with R chamfers. The C chamfer provided to the first side 53 (see FIG. 6) is a corner surface connecting the discharge surface 52 and the side surface 42. An electric field is more concentrated near the first side 53 provided with the C chamfer, so that a discharge point is more likely to arise near the first side 53. Thus, variation in a discharge point can be reduced.

The R chamfer provided to the second side 54 is a round surface or an elliptic surface connecting the discharge surface 52 and the side surface 44. Since the second side 54 opposite to the first side 53 is provided with the R chamfer, a discharge point is less likely to arise near the second side 54, as compared to a case where the second side 54 is provided with a C chamfer. Thus, variation in a discharge point can be further reduced.

The size W1 of the chamfering provided to the first side 53 is smaller than the size W2 of the chamfering provided to the second side 54. Therefore, an electric field is more concentrated near the first side 53, so that a discharge point is more likely to arise near the first side 53. Thus, variation in a discharge point can be further reduced.

The R chamfer provided to the third side 55 (see FIG. 7) is a round surface or an elliptic surface connecting the discharge surface 52 and the side surface 43. The R chamfer provided to the fourth side 56 is a round surface or an elliptic surface connecting the discharge surface 52 and the side surface 45. The size W3 of the chamfering provided to the third side 55 is almost the same as the size W4 of the chamfering provided to the fourth side 56. The sizes W3, W4 of the chamfering may be different.

The size W1 of the chamfering provided to the first side 53 is smaller than the sizes W2, W3, W4 of the chamfering provided to the other three sides 54, 55, 56. Thus, an electric field is even more concentrated near the first side 53, whereby variation in a discharge point can be further reduced.

The size W2 of the chamfering provided to the second side 54 is greater than the sizes W1, W3, W4 of the chamfering provided to the other three sides 53, 55, 56. Thus, an electric field is less concentrated near the second side 54, so that a discharge point is more likely to arise at a part other than the second side 54 and closer to the first side 53. Thus, variation in a discharge point can be further reduced.

The entire round discharge surface 15*a* is opposed to the discharge surface 52 of the tip 51 in the axial-line direction. Therefore, a point where the distance from the first side 53 to the edge 15*b* of the discharge surface 15*a* is shortest is uniquely determined on the first side 53. A discharge point is more likely to arise near the above point on the first side 53, so that variation in a discharge point can be further reduced.

The first side 53 is located closer to the end surface 40 of the base material 31 than the other three sides of the discharge surface 52. An initial flame kernel arising near the first side 53 is less deprived of energy by the base material 31. Therefore, the initial flame kernel grows well and flame propagation is readily started. Thus, ignitability can be improved.

The thickness of the melt portion 35 in the direction perpendicular to the discharge surface 52 becomes greater with decrease in the distance to the end surface 40 of the base material 31 along the discharge surface 52. Therefore, thermal stress near the first side 53 of the tip 51 is more relaxed by the melt portion 35. Thus, breakage of the melt portion 35 or peeling of the tip 51 due to thermal stress can be suppressed.

The third embodiment will be described with reference to FIG. 8 to FIG. 10. In the first embodiment, the case where opposite sides of the four sides of the discharge surface 36 of the tip 34 are provided with C chamfers, has been described. On the other hand, in the third embodiment, a case where two sides sharing a vertex are provided with C chamfers, will be described. The same parts as those described in the first embodiment are denoted by the same reference characters, and description thereof will not be repeated below.

Figure 8:
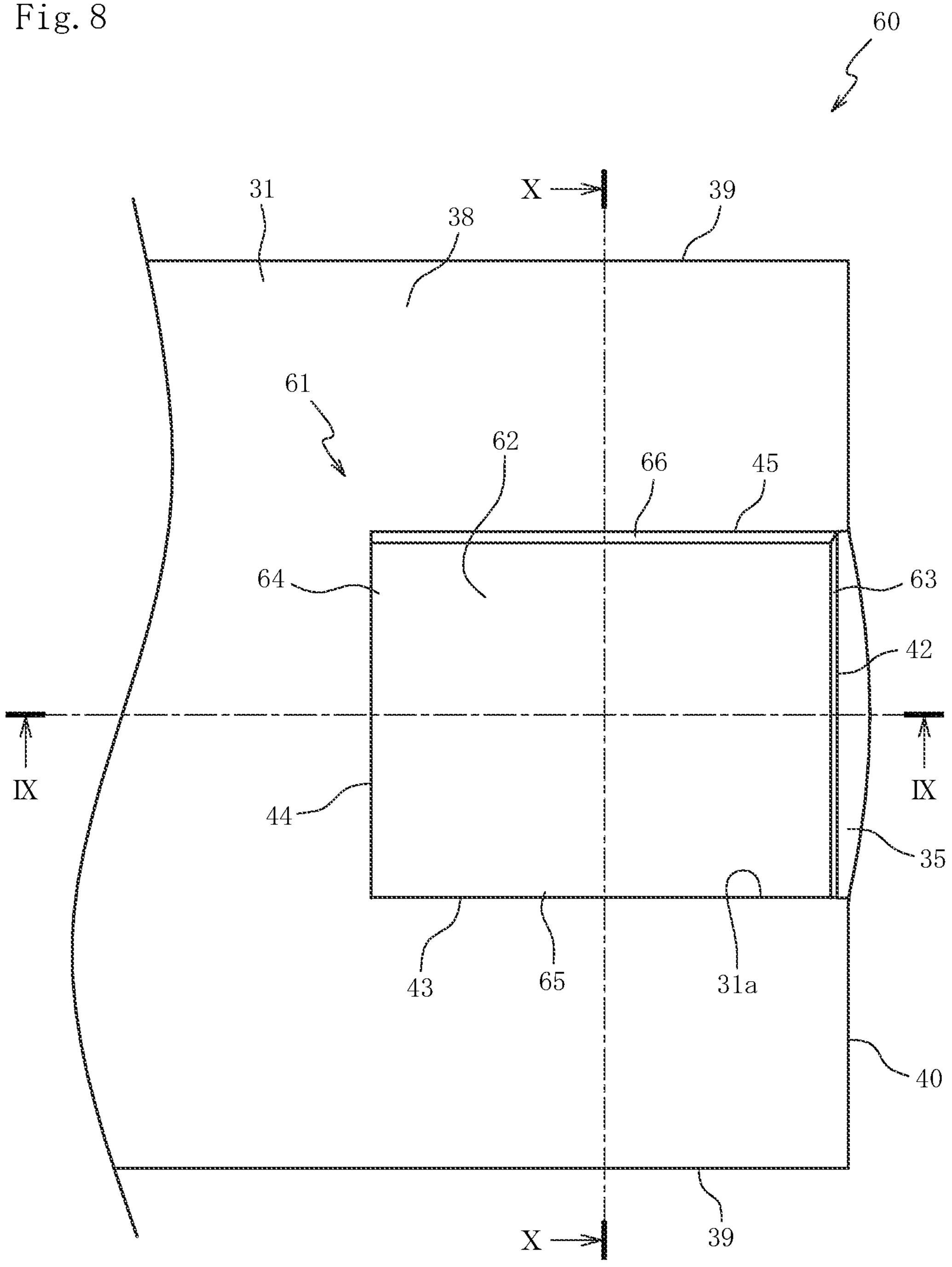
FIG. 8 is a plan view of a ground electrode of a spark plug according to the third embodiment.

FIG. 8 is a plan view of a ground electrode 60 of a spark plug according to the third embodiment. FIG. 9 is a sectional view of the ground electrode 60 along line IX-IX in FIG. 8. FIG. 10 is a sectional view of the ground electrode 60 along line X-X in FIG. 8. Instead of the ground electrode 30 of the spark plug 10 in the first embodiment, the ground electrode 60 is connected to the metal shell 20. FIG. 8 shows the other end portion 33 (see FIG. 1) of the base material 31 of the ground electrode 60, and the one end portion 32 (see FIG. 1) is not shown.

Figure 9:
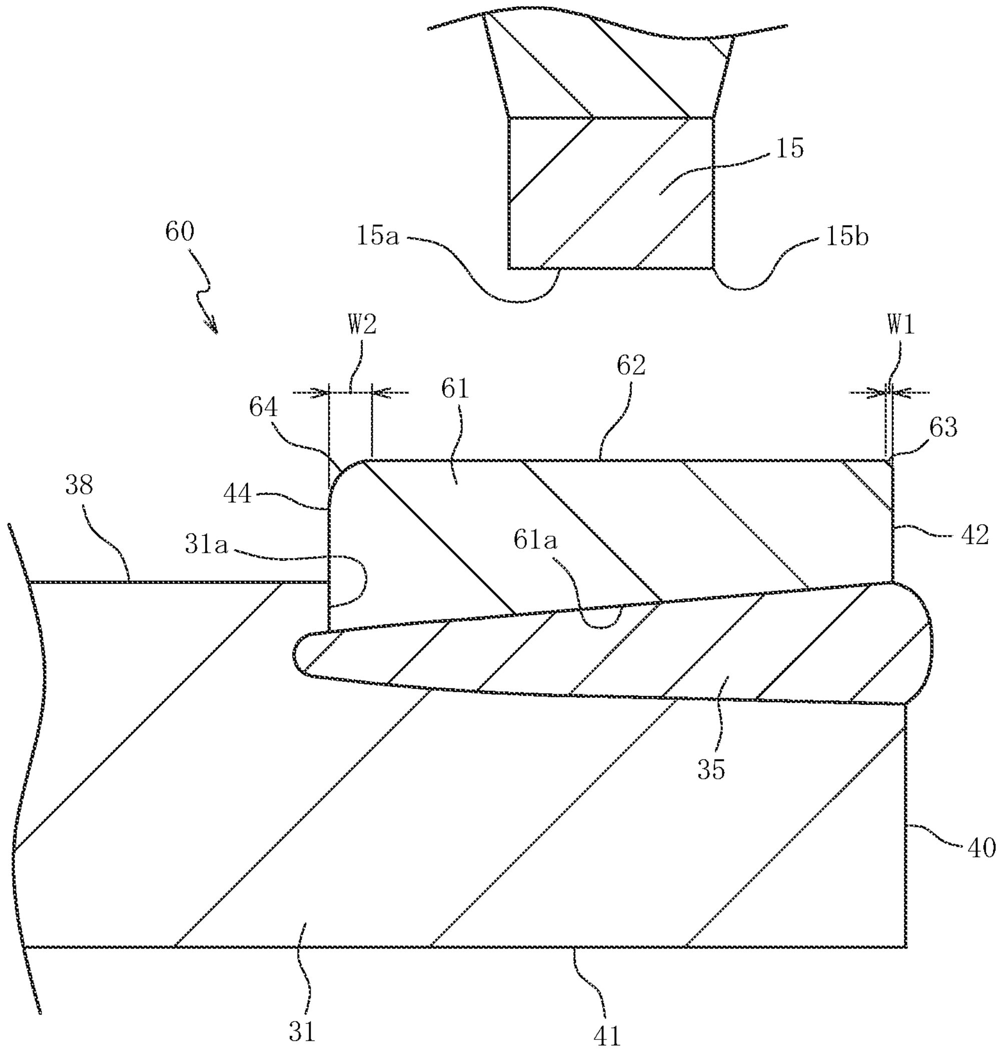
FIG. 9 is a sectional view of the ground electrode along line IX-IX in FIG. 8.
Figure 10:
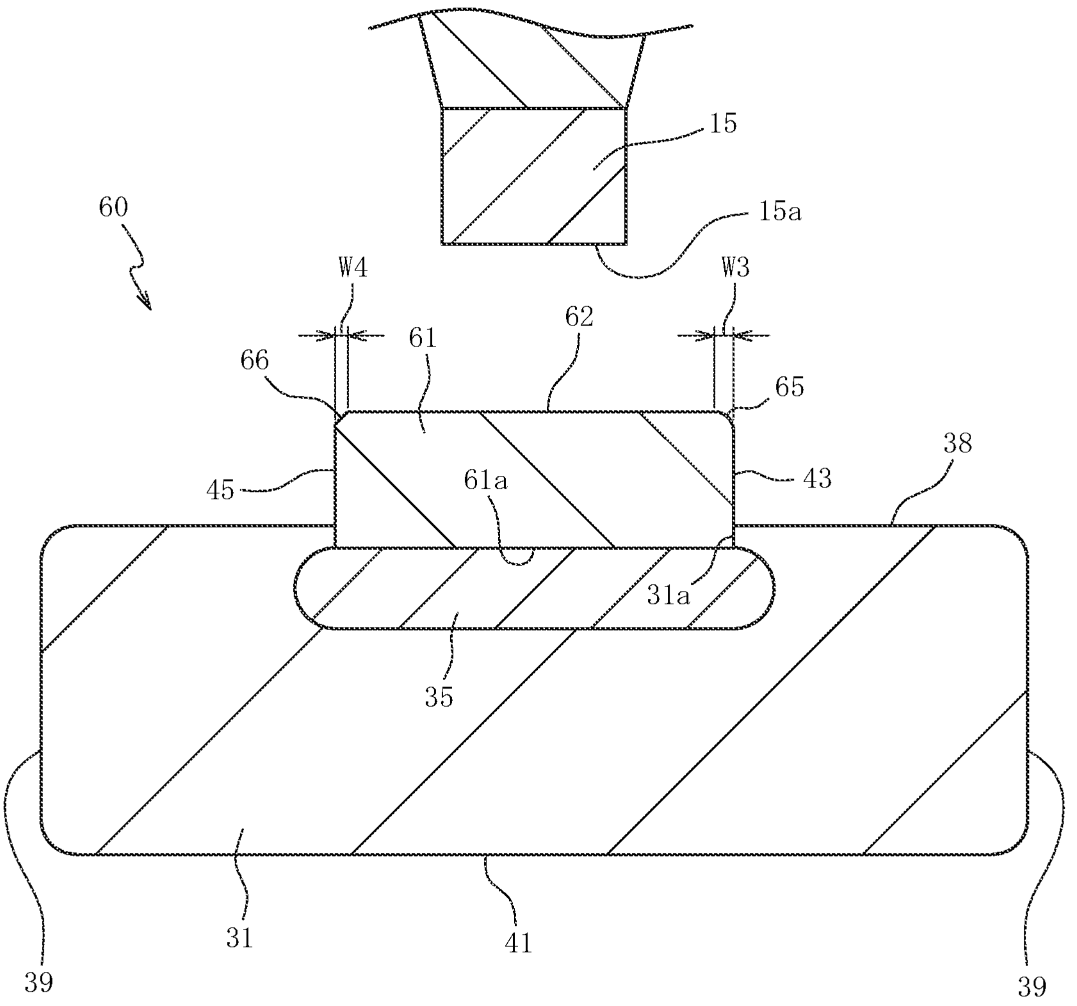
FIG. 10 is a sectional view of the ground electrode along line X-X in FIG. 8.

As shown in FIG. 8 to FIG. 10, a tip 61 of the ground electrode 60 is placed in the recess 31*a* provided to the base material 31. The melt portion 35 for joining the tip 61 to the base material 31 is formed on a back surface 61*a* opposite to a discharge surface 62 of the tip 61, along the discharge surface 62 from the end surface 40 of the base material 31.

The discharge surface 62 of the tip 61 has a quadrangular shape enclosed by four sides. The discharge surface 62 is connected to the side surfaces 42, 43, 44, 45 of the tip 61. In the present embodiment, the area of the discharge surface 62 of the tip 61 is larger than the area of the discharge surface 15*a* (see FIG. 9) of the center electrode 15, and the entire discharge surface 15*a* of the center electrode 15 is opposed to the discharge surface 62 of the tip 61 in the axial-line direction.

The four sides of the discharge surface 62 are intersection lines between the discharge surface 62 and the side surfaces 42, 43, 44, 45 of the tip 61. The intersection line between the side surface 42 and the discharge surface 62 is a first side 63. A second side 64 opposite to the first side 63 is the intersection line between the side surface 44 and the discharge surface 62. The intersection line between the side surface 43 and the discharge surface 62 is a third side 65. A fourth side 66 opposite to the third side 65 is the intersection line between the side surface 45 and the discharge surface 62. In the present embodiment, the first side 63 is located closer to the end surface 40 of the base material 31 than the three sides 64, 65, 66 other than the first side 63.

All the sides 63, 64, 65, 66 enclosing the discharge surface 62 are chamfered. Two or more sides including the first side 63, of the discharge surface 62, are provided with C chamfers. In the present embodiment, the first side 63 and the fourth side 66 are provided with C chamfers, and the second side 64 and the third side 65 are provided with R chamfers. Instead of the R chamfers provided to the second side 64 and the third side 65, C chamfers may be provided to the second side 64 and the third side 65.

The C chamfer provided to the first side 63 (see FIG. 9) is a corner surface connecting the discharge surface 62 and the side surface 42. The R chamfer provided to the second side 64 is a round surface or an elliptic surface connecting the discharge surface 62 and the side surface 44. Since the second side 64 opposite to the first side 63 is provided with the R chamfer, a discharge point is less likely to arise near the second side 64, as compared to a case where the second side 64 is provided with a C chamfer. Thus, a discharge point is more likely to arise at a part other than the second side 64 and closer to the first side 63, so that variation in a discharge point can be reduced.

The R chamfer provided to the third side 65 (see FIG. 10) is a round surface or an elliptic surface connecting the discharge surface 62 and the side surface 43. The C chamfer provided to the fourth side 66 is a corner surface connecting the discharge surface 62 and the side surface 45. In the present embodiment, the size W3 of the chamfering provided to the third side 65 is smaller than the size W4 of the chamfering provided to the fourth side 66. The sizes W3, W4 of the chamfering may be almost the same or the size W3 may be greater than the size W4.

The size W1 of the chamfering of the first side 63 provided with the C chamfer is smaller than the size W4 of the chamfering of the fourth side 66 provided with the C chamfer. Therefore, an electric field is more concentrated near the first side 63. Thus, a discharge point is more likely to arise near the first side 63, so that variation in a discharge point can be reduced.

The size W1 of the chamfering provided to the first side 63 is smaller than the sizes W2, W3, W4 of the chamfering provided to the other three sides 64, 65, 66. Therefore, an electric field is more concentrated near the first side 63. Thus, a discharge point is more likely to arise near the first side 63, so that variation in a discharge point can be further reduced.

The size W2 of the chamfering provided to the second side 64 is greater than the sizes W1, W3, W4 of the chamfering provided to the other three sides 63, 65, 66. Therefore, an electric field is less concentrated near the second side 64 opposite to the first side 63, so that a discharge point is more likely to arise at a part other than the second side 64 and closer to the first side 63. Thus, variation in a discharge point can be further reduced.

The entire round discharge surface 15*a* is opposed to the discharge surface 62 of the tip 61 in the axial-line direction. Therefore, a point where the distance from the first side 63 to the edge 15*b* of the discharge surface 15*a* is shortest is uniquely determined on the first side 63. A discharge point is more likely to arise near the above point on the first side 63, so that variation in a discharge point can be further reduced.

The first side 63 is located closer to the end surface 40 of the base material 31 than the other three sides of the discharge surface 62. An initial flame kernel arising near the first side 63 is less deprived of energy by the base material 31. Therefore, the initial flame kernel grows well and flame propagation is readily started. Thus, ignitability can be improved.

The thickness of the melt portion 35 in the direction perpendicular to the discharge surface 62 becomes greater with decrease in the distance to the end surface 40 of the base material 31 along the discharge surface 62. Therefore, thermal stress near the first side 63 of the tip 61 is more relaxed by the melt portion 35. Thus, breakage of the melt portion 35 or peeling of the tip 61 due to thermal stress can be suppressed.

While the present invention has been described above with reference to the embodiments, the present invention is not limited to the above embodiments at all. It can be easily understood that various modifications can be devised without departing from the gist of the present invention.

In the above embodiments, the case where the discharge surface 36, 52, 62 of the tip 34, 51, 61 has a rectangular shape, has been described. However, the present invention is not necessarily limited thereto. As a matter of course, the discharge surface 36, 52, 62 may have another quadrangular shape. Examples of another quadrangular shape include a square, a parallelogram, a rhombus, and a trapezoid. At least one of the four vertices of the quadrangle may be formed to be a round surface or a corner surface, so as to remove the edge.

In the above embodiments, the case where the first side 46, 53, 63 of the four sides of the discharge surface 36, 52, 62 is located closest to the end surface 40 of the base material 31, has been described. However, the present invention is not necessarily limited thereto. As a matter of course, the second side 47, 54, 64 may be located closest to the end surface 40, or the third side 48, 55, 65 may be located closest to the end surface 40. As a matter of course, the fourth side 49, 56, 66 may be located closest to the end surface 40. That is, the first side may be any of the four sides of the discharge surface 36, 52, 62.

In the above embodiments, the case where the first side 46, 53, 63 closest to the end surface 40 among the four sides of the discharge surface 36, 52, 62 is almost parallel to the end surface 40, has been described. However, the present invention is not necessarily limited thereto. As a matter of course, the side closest to the end surface 40 among the four sides of the discharge surface 36, 52, 62 may be oblique to the end surface 40.

In the above embodiments, the case where the third side 48, 55, 65 and the fourth side 49, 56, 66 of the discharge surface 36, 52, 62 are almost parallel to the second surfaces 39 of the base material 31, has been described. However, the present invention is not necessarily limited thereto. The inclinations of the third side 48, 55, 65 and the fourth side 49, 56, 66 relative to the second surfaces 39 may be set as desired.

In the above embodiments, the case where the tip 34, 51, 61 is placed in the recess 31*a* of the base material 31 of the ground electrode 30, 50, 60, has been described. However, the present invention is not necessarily limited thereto. As a matter of course, the tip 34, 51, 61 may be placed and joined to the first surface 38 of the base material 31, without providing the recess 31*a* to the base material 31.

In the above embodiments, the case where a laser beam is applied to the end surface 40 of the base material 31 of the ground electrode 30, 50, 60 to form the melt portion 35, and thereby the tip 34, 51, 61 is joined, has been described. However, the present invention is not necessarily limited thereto. As a matter of course, for example, a laser beam may be applied to the second surfaces 39 of the base material 31 or the third surface 41 of the base material 31, to form a melt portion, and thereby the tip 34, 51, 61 may be joined to the base material 31. The method for joining the tip 34, 51, 61 to the base material 31 is not limited to laser welding. As a matter of course, the tip 34, 51, 61 may be joined to the base material 31 by resistance welding or diffusion bonding.

In the above embodiments, the case where the discharge surface 36, 52, 62 of the tip 34, 51, 61 is larger than the discharge surface 15*a* of the center electrode 15, has been described. However, the present invention is not limited thereto. As a matter of course, the discharge surface 36, 52, 62 of the tip 34, 51, 61 may be smaller than the discharge surface 15*a* of the center electrode 15. In this case, a part of the discharge surface 15*a* of the center electrode 15 is opposed to the discharge surface 36, 52, 62 of the tip 34, 51, 61 in the axial-line direction.

In the third embodiment, the case where the first side 63 and the fourth side 66 of the discharge surface 62 are provided with C chamfers, has been described. However, the present invention is not necessarily limited thereto. The first side 63 and the third side 65 may be provided with C chamfers, and the second side 64 and the fourth side 66 may be provided with R chamfers. In addition, instead of the R chamfers provided to the second side 64 and the fourth side 66, C chamfers may be provided to the second side 64 and the fourth side 66.

DESCRIPTION OF REFERENCE NUMERALS

10: spark plug
15: center electrode
20: metal shell
30, 50, 60: ground electrode
31: base material
32: one end portion of base material
33: other end portion of base material
34, 51, 61: tip
35: melt portion
36, 52, 62: discharge surface
37: spark gap
40: end surface of base material
46, 53, 63: first side
47, 54, 64: second side
48, 55, 65: third side
49, 56, 66: fourth side

What is claimed is:

1. A spark plug comprising:

a center electrode;

a metal shell insulating and holding the center electrode; and a ground electrode including a base material having one end portion connected to the metal shell, and a tip connected to another end portion of the base material, wherein the tip has a discharge surface opposed to the center electrode with a spark gap therebetween, the discharge surface has a quadrangular shape and is chamfered at four sides thereof, and only a first side which is one of the four sides is provided with a C chamfer.

2. The spark plug according to claim 1, wherein a size of the chamfering provided to the first side is smaller than sizes of the chamfering provided to the three sides other than the first side.

3. The spark plug according to claim 1, wherein the first side is located closer to an end surface of the other end portion of the ground electrode than the three sides other than the first side.

4. The spark plug according to claim 3, wherein the tip is joined to the base material via a melt portion, the melt portion is formed on a back surface opposite to the discharge surface, along the discharge surface from the end surface of the other end portion, and a thickness of the melt portion in a direction perpendicular to the discharge surface becomes smaller with increase in a distance from the end surface along the discharge surface.

5. A spark plug comprising:

a center electrode;

a metal shell insulating and holding the center electrode; and a ground electrode including a base material having one end portion connected to the metal shell, and a tip connected to another end portion of the base material, wherein the tip has a discharge surface opposed to the center electrode with a spark gap therebetween, the discharge surface has a quadrangular shape and is chamfered at four sides thereof, of the four sides, two or more sides including a first side are provided with C chamfers, and in comparison of sizes of the chamfering of the two or more sides provided with the C chamfers, the size of the chamfering of the first side is smaller than the sizes of the chamfering of the other sides.

6. The spark plug according to claim 5, wherein a size of the chamfering provided to a second side opposite to the first side is greater than sizes of the chamfering provided to the three sides other than the second side.

7. The spark plug according to claim 5, wherein a second side opposite to the first side is provided with an R chamfer.

* * * * *